Jan. 16, 1934.  J. P. LAUG ET AL  1,944,031
GATE FOR FILM HANDLING APPARATUS
Filed Dec. 2, 1930
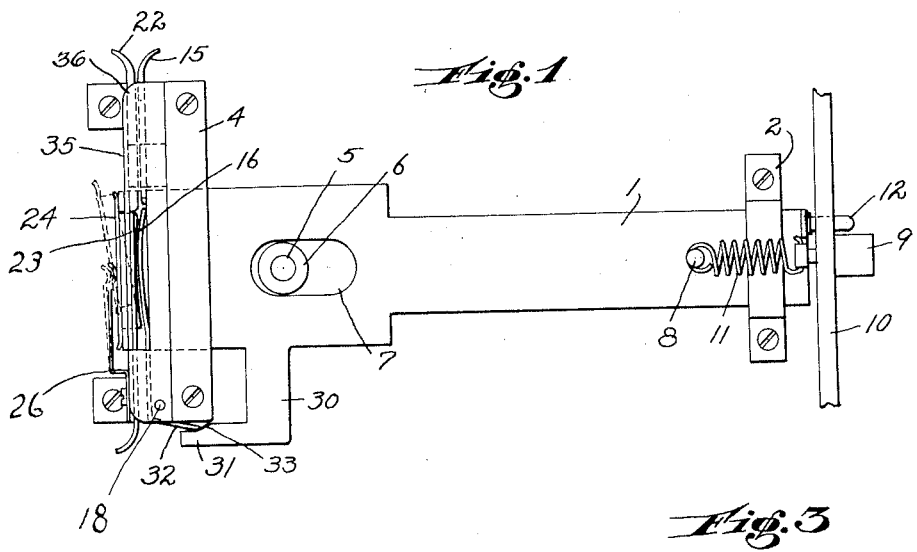
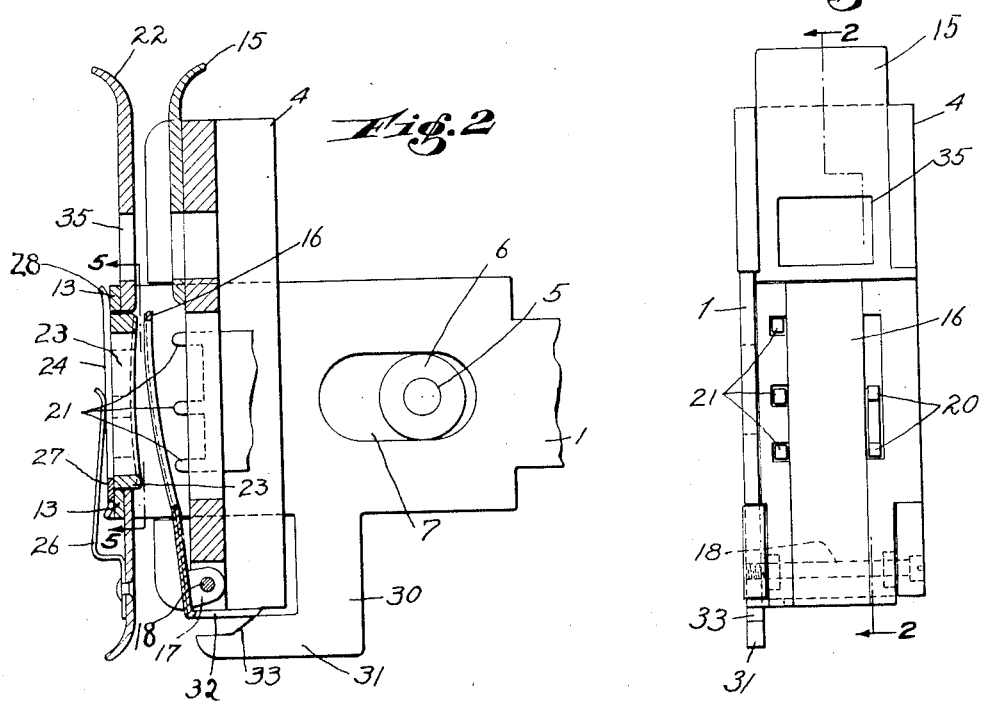
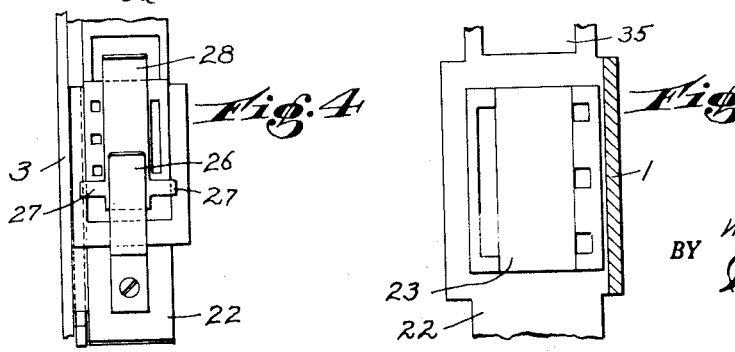
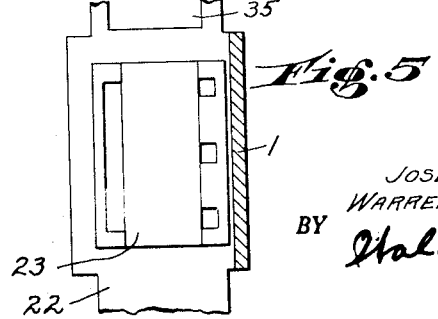
INVENTOR.
JOSEPH PAUL LAUG.
WARREN DUNHAM FOSTER.
BY Haldo L Morse
ATTORNEYS.

Patented Jan. 16, 1934

1,944,031

UNITED STATES PATENT OFFICE 1,944,031

GATE FOR FILM HANDLING APPARATUS

Joseph Paul Laug, Union City, and Warren Dunham Foster, Washington Township, Bergen County, N. J., assignors, by direct and mesne assignments, to Kinatome Patents Corporation, a corporation of New York Application December 2, 1930. Serial No. 499,456

37 Claims. (Cl. 88—17)

The present invention relates broadly to any art in which a film ribbon or other material of similar characteristics is fed, whether in apparatus adapted for the taking or projection of pictures, or in apparatus for the recordation or reproduction of sound, either alone or in conjunction with images of things, or in apparatus of other types.

A principal object of the present invention is the provision of improved mechanism for initially placing a film in operative relation with the teeth of a film feeding or film retaining member, its proper and accurate retension in such relation during the feeding operation, its removal therefrom after such operation, and its protection therefrom before or after such operation. A related object is the provision of control means for such mechanism whereby operation thereof is secured in the desired timed or sequential relation to the opening or closing of the gate and to the various phases thereof with interposition of the desired period of dwell, such mechanism preferably including a positive mechanical operating element and not depending upon spring pressure. We provide a gate wherein the film removing or protecting member is pivoted to the fixed section and operated by a connection with the movable section so constructed that upon the initial portion of the gate opening movement the movable gate section completely operates the removing or protecting member and upon the concluding portion of the gate opening movement such member is maintained motionless. Conversely, the first portion of the gate closing movement is without effect upon such member and the final portion of such closing movement moves such member to inoperative position.

A further object of the invention is the provision of an improved pressure plate, preferably arcuate in form, removably supported in an improved and simplified manner preferably by the movable section of the gate. Our improved gate, including such positioning and protecting or removing elements, is illustrated in connection with the mechanism shown and claimed in the copending application of Barton Allen Proctor, Serial Number 187,980, filed April 30, 1927, but it will be recognized that our structure and the principles thereof may be applied to apparatus of other or different types. Reference is also made to the co-pending application of the said Proctor, Serial Number 332,296, filed January 14, 1929, in which a gate which has certain characteristics in common with that described herein is described and claimed. One object of the present invention is to provide an improved and simplified control mechanism for a gate such as that described in either of the said Proctor applications, and one which operates the film removing or film protecting member by direct connection with the movable section of the gate and in a timed relation therewith different from that exemplified in the second mentioned of the said Proctor applications. Reference is also made to the copending application, Serial Number 345,716, filed March 9, 1929, of Warren Dunham Foster and Frederick Davenport Sweet, and two applications divisional from such application, namely Serial Number 458,536 and 458,537, both filed May 31, 1930, such three above mentioned applications representing in certain of their aspects improvements over the structure described and claimed herein.

Other objects advantages and characteristics are apparent in the following description, the attached drawing and the subjoined claims. Although we are showing one preferred embodiment of our invention, it will be readily understood that we are not limited to any particular construction as changes can readily be made without departing from the spirit of our invention or the scope of our broader claims.

In the drawing:

Figure 1 is a side elevational view of the gate in closed position, together with the supporting and controlling mechanism for the gate and the parts thereof;

Figure 2 is a similar view, enlarged and in section, as indicated by the line 2—2 of Figure 3, of the gate in partially open position with the film removing and protecting member positioned in protecting position;

Figure 3 is a front view of the fixed section of the gate including the protective member pivotally attached thereto;

Figure 4 is a front view of a portion of the movable section of the gate with particular reference to the insertion or removal of the pressure plate, such plate being in process of removal;

Figure 5 is an enlarged view taken upon the line 5—5 of Figure 2 looking in the direction of the arrows toward the film engaging side of the pressure plate and the movable gate section.

In carrying out the present invention, a gate supporting bracket 1 is mounted in any desired way in the camera or projector as by the strap 2 attached to the main casting 3. Such supporting bracket 1 extends forwardly or to the left as viewed in Figures 1 and 2 and through a suitable slot cut in the under portion of the fixed gate bracket 4 and forwardly of such bracket. The fixed bracket 4 is also mounted as by screws upon the main casting 3. The shaft 5 which drives the film engaging and moving or retaining fingers may extend upwardly through the bearing 6 which extends through an appropriate slot 7 in the movable bracket 1. Reaching from the post 8 mounted upon the movable bracket 1 to the adjusting and supporting member 9 which is threaded through the back portion 10 of the apparatus is the spring 11 which tends to pull the movable bracket 1 to the right as viewed in Figures 1 and 2 for the purpose of closing the gate. For opening the gate, the pin 12 is provided which extends from the bracket 1 through the back portion 10 to a convenient point externally thereof. The movement of such pin 12 to the left as viewed in Figures 1 and 2 against the pressure of the spring 11 will open the gate. Means for retaining the bracket in such open position may be provided as desired, or as illustrated in the copending application of the said Proctor to which reference has first heretofore been made. The bracket 1 terminates inwardly, or to the left as viewed in Figure 2, in two upstanding right angled projections 13 to which the movable gate section may be attached as later described.

Mounted upon the fixed bracket 4 is the fixed film guiding member 15 which cooperates with the pivoted member 16 to form the inner portion (or right hand portion as viewed in Figures 1 and 2) of the film track. Such pivoted member 16, as is clearly apparent from the drawing, includes two lips 17 which are bent at right angles to its main or film engaging portion and adapted for the reception of the pin 18 by means of which the member is pivotally mounted upon the fixed bracket 4. The upper portion of the pivoted member 16 is preferably formed of arcuate cross section to accommodate the arcuate movement of the moving fingers 20 (Figure 3) which are driven as by the shaft 5 through an appropriate mechanism not shown. In order to retain the film in position during the period of exposure or projection while such moving fingers 20 are disengaged from the film, the retaining fingers 21, likewise driven by the shaft 5 and in a reciprocating manner, may be provided if desired. Appropriate openings are formed in the pivoted member 16 through which such moving and retaining teeth may operate.

Mounted upon the upstanding projections 13 of the movable bracket 1 is the movable gate section 22. In an appropriate opening in a slightly widened portion of such section there is mounted a film pressure or retaining member or block which comprises the arcuate portion 23 which engages the film and the supporting plate 24 which extends horizontally beyond the periphery of such opening. Suitable openings for the fingers 20 and 21 are provided in the block 23. Attached preferably to the lower portion of the movable gate section 22 is the retaining spring 26 which bears against the central portion of the film retaining block and supplies the resiliency which is necessary for the proper feeding of the film, as well as for the initial engagement of the teeth with the appropriate perforations of the film. The magnitude of such spring 26 is materially less than that of the spring 11 which controls the section 22 upon which the pressure member 23 is mounted. It will be understood that the contact of the spring upon the retaining member at one central point permits movement at practically speaking any angle away from the film as the exigencies of film feeding may require.

The lateral extensions 27 from the supporting plate 24 may be so provided as to bear against the sides of the opening and the upwardly extending lip 28 forms a convenient handle. When it is desired to remove the pressure block for cleaning or otherwise the user merely grips the lip 28, tilts the block to the left, as viewed in Figures 1 or 2, and slips the whole structure upwardly until the spring no longer engages the plate 24. See the dotted line position shown in Figure 1. The replacement of the member is equally simple. If quicker and more even yielding of the pressure block to inequalities affecting one end of the film only is desired, the extensions 27 may be omitted. In such case where changing the pressure block, the user merely moves the spring 26 to the left as viewed in Figure 1 or 2 while he re-inserts the pressure member. Removal, cleaning and replacement require very little time. The film track, as is common in the art, is preferably relieved.

For controlling the pivoted protective and removing member 16, a lip 30 extends from the movable gate bracket 1 downwardly and then to the left as viewed in Figures 1 and 2, and includes a right angled protuberance 31 with an irregularly shaped portion or cam 33 which bears against the extension 32, which is bent to the right as viewed in Figures 1 and 2, from the pivoted section 16.

A member 36, which may be integral with the fixed gate section 15 extends leftwardly therefrom as viewed in Figure 1 and is disposed alongside the edge of the movable section 22 when the latter is in a closed position. The member 36 serves as a side edge guide for the film and helps to place the usual perforations in the film in alignment with the teeth 21.

As will be evident by an examination of the drawing, as the gate is opened by the movement of the movable bracket 1 to the left from the position shown in Figure 1 to that shown in Figure 2, the inclined surface of the cam 33 of the operating extension 31 of bracket 1 will immediately bear against the extension 32 of the pivoted member 16, and as the movable gate section 22 moves away from the fixed section 15 the removing member 16 will at once be operated until it assumes the position shown in Figure 2. Further movement of the bracket 1 and the gate section 22 to the left or open position will be without effect upon the pivoted member. Thus when the extension 32 of the member 16 lies along the flat or right hand portion of the extension 31 it will be seen that the removing and protecting member 16 will be held locked in position with the film protected from the teeth. Obviously the movement of the member 16 from the position shown in Figure 1 to that shown in Figure 2 will have been effective during the first portion of the movement of the gate section 22 for removing the film from its work path out of engagement with the moving or retaining teeth, and clear of the guide member 36. Thereafter, if desired, the film may be moved laterally out of the gate without catching on any of the gate members or film feeding members.

When the gate is permitted to close through the operation of the spring 11 and the movement of the gate bracket 1 from the position shown to the left of that shown in Figure 2 to that shown in Figure 1, it will be evident that the protecting member 16 for a time will be held in protecting position and then will move toward the moving and retaining fingers. It will be noted that the film is gripped between the pressure member 23 and the protective member 16 during such latter portion of the gate closing movement.

It will be readily understood that if desired the member 16 may be pivoted at the top instead of at the bottom. Such construction is necessary when our invention is applied to apparatus of the type in which the free end of the film is propelled from a delivery member through the open gate toward a taking up member, as for example that shown and claimed in the co-pending application of Warren Dunham Foster and Frederick Davenport Sweet, Serial Number 352,525, filed April 4, 1929.

In the drawing the aperture 35 has been shown as in the plate 22 but if desired it may be placed in the arcuate film retaining member, in such case the supporting spring being bifurcated with each portion bearing upon a side of the plate 24. Any desired type of moving and retaining fingers may be employed, or if desired the retaining fingers may be entirely eliminated.

It will be noted that in the preferred form, the section of the film at the aperture is subjected to relatively heavy pressure and permitted little movement and hence kept flat and in the focal plane so that distortion is avoided, while the film opposite the moving and retaining teeth is subjected to relatively light pressure and is permitted relatively great movement. Such arrangement has obvious advantages. During the initial period of "groping", while the teeth are seeking the appropriate perforations in the film, or in any emergency during feeding, such as those due to torn or destroyed perforations or badly made patches, the film is permitted the needed latitude, in the area in which such latitude is required, so that injury is avoided while at the projection or exposure gate, where conditions are critical and much or easy movement not necessary, it is held to relatively close limits and in the focal plane.

Many of the advantages of the present invention will be obvious from the foregoing specification, the attached drawing, and the subjoined claims. Other advantages include the provision of simple inexpensive and positive means for operating film removing or film protecting elements, in desired timed or sequential relation to other operations in connection with the gate, and by a direct connection between the movable gate member and the film removing means.

Other advantages include the provision of a film pressure member and mounting therefor which is unusually effective and permits quick and easy removal and reinsertion, and the provision of pressure members of different magnitudes and capable of different degrees of movement so that the film is subjected to the particular pressure most advantageous at that particular point.

Other advantages arise from the organization of members for moving the film far enough out of its work path to clear both the teeth of the feeding members and the side edge guide member of the gate structure so that the film can be moved laterally out of the gate after the latter is opened without danger of it catching on any of the gate members.

We claim:

1. In a gate for use in a film handling apparatus, two film-engaging members, each movable relatively to the other, said members being movable into a first position wherein one defines one side of a work path through which a film may be fed and the other defines the opposite side of said work path, or into a second position wherein one traverses said path and the other is disposed relatively distantly from its first named position, a movable support on which one of said members is mounted, a connection between said support and said other member for moving said other member from one of said positions to the other upon movement of said support, and means for moving said support.

2. For use in a film handling apparatus, an operable gate adapted to define a work path through which a film may be fed, said gate including a fixed support, a movable support, a plurality of film engaging sections so disposed as to define the opposite sides of said work path and where said gate is closed to engage and guide the film, one of said sections being pivoted upon said fixed support for movement in a direction angular to said path and the other of said sections being mounted upon said movable support for movement therewith toward or away from said work path, and an operating connection between said pivoted section and said movable support for operatively moving said pivoted section upon movement of said support.

3. For use in a film handling apparatus, a gate adapted to define a work path through which a film may be fed, said gate including a fixed support, a first film engaging member, adapted to normally define one side of said path, and being mounted upon said fixed support for movement relatively thereto, a movable support, and a second film engaging member, adapted to define the other side of said path, and being mounted upon said movable support for movement therewith toward or away from said path, said first member and said movable support each including engaging portions so positioned that the movement of said movable support moves said first member relatively to said path.

4. For use in a film handling apparatus, a gate adapted to define a work path through which a film may be fed and a toothed film feeding member intersecting said work path for feeding the film therealong, said gate including a fixed support, a first film engaging member, adapted normally to define one side of said path and being mounted upon said fixed support for movement relatively thereto from and to a position wherein it is disposed between the teeth of said feeding member and the film wherein the film is shielded from said teeth, a movable support, and a second film engaging member, adapted to define the other side of said path and being mounted upon said movable support for movement therewith toward or away from said work path, said first film engaging member and said movable support each including engaging portions so positioned that the movement of said movable support moves said first member from and to said shielding position.

5. In a film handling apparatus, a gate comprising a fixed section and a section relatively movable thereto, a toothed member for feeding a film through said gate, and an operable member movable from and to a position wherein it shields the film from the teeth of said member, said movable gate section and said shielding member including engaging cam formations so positioned that the movement of said movable section operates said shielding member.

6. In a film handling apparatus, a gate comprising a fixed section and a section relatively movable thereto, a toothed member for feeding a film through said gate, and an operable member movable to a position wherein it removes the film from the teeth of said member, said movable gate section and said film removing member including engaging cam formations so positioned that the movement of said movable section operates said film removing member.

7. In a film handling apparatus, a gate adapted to define a path through which a film may be fed, said gate including two film engaging sections, one of said sections being fixed and adapted to define one portion of one side of such path and the other of said sections being pivoted upon said first mentioned section for movement relatively thereto, and being adapted when moved into a cooperative position relatively to said fixed section, to define another and adjacent portion of the same side of such path, and means for moving said pivoted section to and from such cooperative position, said pivoted section including an extension angular to its film engaging portion and said means further including a movable control member having a formation cooperating with said extension for communicating movement thereto.

8. In a film handling apparatus, a main frame and a gate supported thereby, said gate comprising two sections normally disposed in positions wherein they define a path for a film therebetween, one of said sections being movably mounted upon said frame and extending therefrom at substantially a right angle thereto, a movable plate disposed parallel to said frame, the other of said sections being mounted upon said plate at substantially a right angle thereto, said plate being disposed between said frame and the edge of such film path adjacent thereto and between said frame and the edge of said first mentioned section adjacent thereto and including a formation which engages said first mentioned section for moving said first mentioned section upon the movement of said plate.

9. A film handling apparatus including an openable gate, said gate having a plurality of movable film engaging sections, a movable support on which one of said sections is mounted, means for moving said support to a first position wherein said section mounted thereupon is disposed adjacent another of said sections whereby a work path is defined between said sections through which a film may be normally fed and for moving said support to a second position wherein said section mounted thereupon is disposed relatively distant from said work path whereby the gate is opened, and an operating member operatively connecting said support and said second mentioned section, said member during the first portion of the movement of said support from said first toward said second position moving said second mentioned section across such path thereby closing it for the passage of film therethrough and during the succeeding and final portion of such movement maintaining said second mentioned section in such last above mentioned position.

10. In a film handling apparatus, a gate which defines a normal work path through which a film may be fed, operable toothed means intersecting such path for feeding the film therethrough, said gate including a film engaging member which is movable to a first position wherein it defines one side of said work path and to a second position wherein it defines one side of an auxiliary work path and is disposed between such auxiliary path and the teeth of said feeding means, said film engaging member being formed with an extension disposed in a direction angular thereto and extending therefrom in a direction away from such path, a control member which is movable into engagement with said extension and is effective for moving said film engaging member from one of such positions to the other, and means for maintaining said film engaging member in either of said positions during the continued operation of said toothed feeding means.

11. In a film handling apparatus, a gate, a first and second oppositely disposed member engaging the film upon opposite sides thereof in order to define a normal work path through which a film may be fed, said film engaging members being mounted for relative movement therebetween, toothed means intersecting said normal work path for feeding the film therealong, said first film engaging member being movable to a first position wherein it defines one side of said work path and to a second position wherein it defines one side of an auxiliary work path and is disposed between such auxiliary work path and the teeth of said feeding means, said second film engaging member being so disposed that it forms the opposite side of said auxiliary path, said first film engaging member being formed with an extension disposed in a direction angular thereto and extending therefrom in a direction away from such work path, and a control member which engages said extension and is effective for moving said film engaging member from one of such positions to the other.

12. In a film handling apparatus, an apertured gate, said gate including two sections, one of said sections engaging one side of a film and the other section engaging the other side of the film, a fixed support for one of said sections, a movable support upon which the other of said sections is mounted for movement therewith, means for moving said movable support into a position wherein said section mounted thereupon is disposed relatively remotely from said fixed section, operable means disposed between said sections and movable relatively to both of said sections and effective for guiding a film into a pre-determined position between said sections when said movable section is situated in such remote position, and an operating connection between said movable support and said guiding means for moving said guiding means into operative guiding position upon the movement of said movable support.

13. In a film handling apparatus, an apertured gate, said gate including two sections, a fixed support for one of said sections, a movable support upon which the other of said sections is mounted, means for moving said movable support into a position wherein said section mounted thereupon is disposed relatively remotely from said fixed section, and operable means movable relatively to both of said sections to a position wherein it is effective for guiding a film into a predetermined position between said sections when said movable section is in such remote position, said guiding means and said movable support including cooperating portions so positioned that the movement of said movable support operates said guiding means.

14. A gate for use in a film handling apparatus, said gate comprising a plurality of sections engaging the film upon opposite sides thereof one of which sections includes a straight portion adapted to engage the film, a presser member extending through an opening in such straight portion of said last mentioned section and movable relatively thereto and including an arcuate portion adapted to engage the film, said section being provided with such an opening, a feeding member movable in an arcuate path, said feeding member being disposed opposite said arcuate portion, and means for yieldingly maintaining said presser member in contact with the film and for urging the film toward said feeding member.

15. A gate for use in a film handling apparatus, said gate comprising a plurality of film engaging members engaging the film upon opposite sides thereof, one of which members includes a straight section adapted to engage the film and having an opening therethrough, a presser member extending through said opening in said straight section and movable relatively thereto and including an arcuate portion adapted to engage the film, said straight section being formed with portions extending longitudinally beyond such opening and into engagement with the film, a feeding member movable in an arcuate path, said feeding member being disposed opposite said arcuate portion, and means for resiliently mounting said presser member upon said first mentioned member and for urging the film toward said feeding member.

16. For use in a film handling apparatus, a gate adapted to define a path through which a film may be fed, said gate comprising a first section and a second section, said first and second sections being adapted to engage the same side of the film and said second section being mounted upon said first section for movement relatively thereto, a mounting for said first section for directing the movement of said first section toward or from engagement with the film in a direction substantially at right angles to such path, and a third section engaging the other side of the film, said third section also being movable.

17. For use in a film handling apparatus, a gate comprising a plurality of film engaging sections each movable relatively to the others, a first and second of said sections being adapted to engage the same side of the film and said second section being mounted upon said first section for movement relatively thereto, a third of said sections being adapted to engage the other side of the film at the same time as said first and second sections engage the film, and control means operatively connecting said first and third sections and effective for moving the same in predetermined relation to each other.

18. For use in a film handling apparatus, a gate adapted to define a path through which a film may be fed, said gate including three sections all adapted to engage the same film at the same time and each movable relatively to both of the others, two of said sections being adapted to engage the same side of the film and one of said last mentioned sections being mounted upon the other thereof, the third of said sections being adapted to engage the opposite side of the film, a mounting for said third section for directing the movement of said third section in a direction angular to such path, and an operating connection between said first and third sections.

19. For use in a film handling apparatus, a gate comprising a first section and a second section, said first and second sections being adapted to engage the same side of the film, and a third section engaging the other side of the film at points opposite those at which said first and second sections engage the film, all of said sections being movable relatively to each other and said second section being so disposed as to extend through an opening in said first section and into engagement with the film, said first section being provided with such an opening.

20. In a film handling apparatus, a gate through which a film may be fed, said gate including two presser members which engage the same side of the film and a spring for maintaining each of said members in yielding engagement with the film, one of said springs being constructed of a magnitude materially differing from that of the other thereof, one of said members and its spring being mounted on the other member.

21. An openable gate for use in film handling apparatus, said gate comprising a first and second movable film engaging member, one of said members being disposed upon one side of a film and the other of said members being disposed upon the other side thereof, said first and second members being movable into a first position, wherein said members are disposed in cooperative and parallel relation to each other whereby a work path is formed therebetween through which the film may be normally fed, and to a second position, wherein said first and second members are disposed in a relatively distant relation to each other so that the film may be initially inserted therebetween or removed therefrom and wherein said first movable member traverses said first mentioned normal work path, a fixed support upon which said first member is movably mounted, a movable support upon which said second member is mounted for movement therewith, and an operating connection between said movable support and said first member for moving said first member upon the first portion of the movement of said movable support whereby said first and second members are moved from said first position toward said second position and for maintaining said first member motionless during the final portion of such movement during which said second member moves clear of said work path and into said second mentioned position.

22. In a gate for film handling apparatus through which a film may be fed, a first presser member and a second presser member, each of said members engaging the same side of the film, said second presser member having a concave surface for engaging the film, instrumentalities for mounting said second member on said first member, and a separate spring for maintaining each of said members in yielding engagement with the film, the spring for said second member having a stiffness materially less than the stiffness of the other of said springs, and means for mounting the spring for said second member on said first member.

23. In a film handling apparatus, a combination of an aperture plate having an opening therethrough adjacent the aperture, a pressure pad loosely mounted in said opening for engaging the film, and a leaf spring having one end fastened to said aperture plate and the other end formed with a rounded contact portion engaging against the central portion of said pressure pad, whereby said pad may rockably yield about the end of said spring as a pivot.

24. In a gate for a film handling apparatus through which a film may be fed, a plurality of presser members which engage the same side of the film, and a separate spring for maintaining each of said members in yielding engagement with the film, the springs associated with certain of said members having a stiffness materially different from the stiffness of other of said members.

25. In a gate for a film handling apparatus through which a film may be fed, two presser members which engage the same side of the film, instrumentalities for mounting one of said presser members on the other, and a separate spring for maintaining each of said members in yielding engagement with the film, one of the said springs having a stiffness materially different from the stiffness of the other of said springs.

26. In a gate for a film handling apparatus having a relatively fixed member defining one side of a work path for the film, a plurality of film presser members each mounted for pressing against the face of the film opposite from said fixed member, and a plurality of springs for urging said presser members against the film, a spring associated with one of said presser members being stiffer than the springs associated with the other of said presser members.

27. In a film handling apparatus, a gate through which a film may be fed, said gate including a first and a second presser member, said first presser member being characterized by a relatively unyielding film engaging surface, a first spring for urging said surface against the film, said second presser member being mounted upon said first member for movement therewith and relatively thereto, and a second spring for urging said second presser member toward the film, said first and second springs being of different magnitudes.

28. In a film handling apparatus, a gate through which a film may be fed, said gate including a relatively fixed member and a member movable relatively to said fixed member, said movable member being characterized by a non-resilient film engaging portion, a first spring for urging said movable member toward the film so that its non-resilient film engaging portion is pressed thereagainst, a presser member mounted upon said movable member and movable therewith and relatively thereto, and a second spring for urging said presser member against the film, said first and second springs being of different magnitudes.

29. In a film handling apparatus, a gate forming a channel through which a film may be fed, said gate including an apertured member, a toothed member for feeding a film through said channel, two presser members associated with said gate and feeding member, a first of said presser members being disposed opposite the periphery of the aperture of said apertured gate member and the second thereof being disposed opposite said toothed feeding member, a first spring for urging said first presser member toward said aperture, and a second spring for urging said second presser member toward said toothed feeding member, said first spring being of relatively great magnitude for maintaining the film flat at the aperture during the feeding thereof and said second spring being of relatively little magnitude whereby during the preliminary positioning of the film upon the teeth of said feeding member the film is allowed relatively great movement in respect to said teeth thereby decreasing the possibility of its injury therefrom.

30. In a film handling apparatus, a gate forming a channel through which a film may be fed, said gate including an apertured member, two presser members disposed oppositely to said apertured member, one of said presser members being disposed between the aperture of said member and one end of the gate and the other of said presser members being disposed between said aperture and the other end of said gate, first spring means for moving one of said presser members toward said apertured member, and second spring means for moving the other of said presser members toward said apertured member, the magnitude of said first and second spring means being markedly different whereby the film within a section of the gate between said aperture and one end of the gate is subjected to resilient pressure markedly different from that to which the film within a section of the gate between said aperture and the other end of said gate is subjected.

31. In a film handling apparatus, a gate forming a channel through which a film may be fed, a toothed feeding member extending within said channel for feeding the film therethrough, a relatively fixed member defining one side of said channel, said relatively fixed member being formed with an opening through which a tooth of said feeding member extends, first relatively movable presser means associated with said feeding member and disposed opposite to said relatively fixed member, first resilient means for urging said first presser means against the film, second relatively movable presser means disposed between the point at which said feeding member engages the film and an end of said gate and opposite to said relatively fixed member, and second resilient means for urging said second presser means toward the film, said first and second resilient means being of markedly different magnitudes whereby the sections of the film opposite to said first and second presser means respectively are subjected to resilient pressure of markedly different degrees.

32. In a film handling apparatus, a guiding member formed with an aperture therein, for the exposure of a film to light, a toothed member for feeding the film past said aperture, a first presser member disposed opposite the periphery of said aperture for maintaining the film in close contact with the periphery of said aperture, a first spring for urging said first presser member against the film and toward said apertured member, a second presser member, mounted upon said first presser member and disposed opposite the teeth of said feeding member for maintaining the film in engagement with said teeth, and a second spring, of a magnitude materially different from that of said first spring, for urging said second member against the film and toward said teeth.

33. In a film handling apparatus, a guiding member formed with an aperture therein, for the exposure of a film to light, a toothed member for feeding the film past said aperture, a first presser member disposed opposite the periphery of said aperture for maintaining the film in close contact with the periphery of said aperture, a first spring for urging said first presser member against the film and toward said apertured member, a second presser member, mounted upon said first presser member, and disposed opposite the teeth of said feeding member for maintaining the film in engagement with said teeth, and a second spring, of a magnitude materially less than that of said first spring, for urging said second member against the film and toward said teeth, said second spring being mounted upon said first presser member, the greater magnitude of said first spring being sufficient to maintain the film flat at the aperture during the feeding operation irrespective of the movement of said second presser member, against its relatively weak spring, as the exigencies of the feeding operation demand.

34. In a film handling apparatus, a guiding member formed with an aperture therein, for the exposure of a film to light, a toothed member having an arcuate path of movement for feeding the film past said aperture, a first presser member disposed opposite the periphery of said aperture for maintaining the film in close contact with the periphery of said aperture, a first spring for urging said first presser member against the film and toward said apertured member, a second presser member with an arcuate face corresponding to the path of travel of said toothed feeding member, said second presser member being mounted upon said first presser member in an opening therethrough for movement therewith and movement relatively thereto, said first presser member being provided with such an opening, and a second spring for urging said second presser member toward the film and toward said teeth, said second spring being of materially less magnitude than said first spring so that said second presser member may readily move under the influence of the film and said feeding member without disturbing the contact of the film with said apertured member.

35. In a film handling apparatus, the combination of an aperture plate having an opening therethrough, a pressure pad loosely mounted in said opening for engaging the film adjacent the aperture in said plate and a leaf spring mounted on said plate, one end of said spring engaging against the center portion of said pad for pressing against said film, the engagement of said spring against said center portion permitting said pad to be rockably moved about the end of said spring as a pivot.

36. In a gate for a film handling apparatus, in combination, a first section defining one side of a work path through said gate, a toothed feeding member for the film extending through said first section across said work path, a second section defining the other side of said work path, means for moving said second section away from said first section and providing an increased space between said sections so that the film may be more easily threaded through said gate, a member disposed along the side of said work path and pivoted on said first section adjacent one extremity thereof, and means associated with said movable section and cooperating with said pivoted member for moving the free end of said pivoted member away from said fixed section sufficiently to guide the leading end of the film past said feeding member when said film is being threaded through said gate.

37. In a film handling apparatus, in combination, a fixed gate section, a movable gate section, means for moving said movable section away from said fixed section, a member pivoted on said fixed section and extending along the path of the film in approximate alignment with said fixed section, said pivoted member having a convexed face disposed next to said film, means for swinging said pivoted member against the film and moving the film away from said fixed section, the convex face of said pivoted member serving to effect a rolling friction action between said pivoted member and the film while the film is being moved, thereby decreasing the rubbing action of said pivoted member upon the film.

JOSEPH PAUL LAUG.
WARREN DUNHAM FOSTER.